United States Patent Office 3,535,228
Patented Oct. 20, 1970

3,535,228
HYDROTREATING CATALYST AND PROCESS
Sigmund M. Csicsery, Lafayette, and Thomas R. Hughes and Joseph Jaffe, Berkeley, Calif., assignors to Chevron Research Company, San Francisco, Calif., a corporation of Delaware
Continuation-in-part of applications Ser. No. 750,283, Aug. 5, 1968, and Ser. No. 752,538, Aug. 14, 1968.
This application Sept. 18, 1968, Ser. No. 760,619
Int. Cl. C10g 13/04
U.S. Cl. 208—59                    23 Claims

ABSTRACT OF THE DISCLOSURE

A catalyst comprising a layered synthetic crystalline aluminosilicate cracking component, preferably dispersed in a matrix comprising a siliceous gel, said component preferably being substantially free of any catalytic loading metal or metals when dispersed in said matrix, and at least one hydrogenating component selected from Group VIII metals and compounds thereof, and processes using said catalyst.

RELATED APPLICATION

This application is a continuation-in-part of Joseph Jaffe and Sigmund M. Csicsery application for "Hydrotreating Catalyst and Process," Serial No. 752,538, filed Aug. 14, 1968, which in turn was a continuation-in-part of Joseph Jaffe application for "Hydrotreating Catalyst and Process," Ser. No. 750,283 filed Aug. 5, 1968.

INTRODUCTION

This invention relates to catalytic hydrocracking of petroleum distillates and solvent-deasphalted residua to produce high-value fuel products, including jet fuels and gasoline.

PRIOR ART

It is known that a catalyst may comprise a crystalline zeolitic molecular sieve component associated with other catalyst components. It is also known that at least some of said other catalyst components may be in the form of a matrix in which the molecular sieve component is dispersed. It is also known that such catalysts may be used for such reactions as catalytic cracking, hydrocracking, and hydrodesulfurization. Representative prior art patents disclosing one or more of the foregoing matters include: U.S. Pats. 3,140,251 and 3,140,253, British Pat. 1,056,-301, French Pats. 1,503,063 and 1,506,793.

There has been a continuing search for further improvements in such catalysts, and in similar multicomponent catalysts, particularly for hydrocracking and hydrofining uses.

It is also known that a crystalline zeolitic molecular sieve cracking component, while relatively insensitive to organic nitrogen compounds and ammonia, has a well-ordered and uniform pore structure as a result of the crystal structure having bonds that are substantially equally strong in three dimensions. This provides definite limitations on the access of reactant molecules to the interiors of the pores.

It is also known, particularly from Granquist U.S. Pat. 3,252,757, that a relatively new layered crystalline aluminosilicate clay-type mineral that has been synthesized has the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6

A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 A. to an upper limit of about 12.0 A. when A is monovalent, to about 14.7 A. when A is divalent, and to a value intermediate between 12.0 A. and 14.7 A. when A includes both monovalent and divalent cations. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said layered synthetic crystalline aluminosilicate mineral (hereinafter included in the term, used for brevity, "layered aluminosilicate," which term also is intended to include any other catalytically active layered crystalline aluminosilicate, whether synthetic or natural), in the dehydrated form, is known from U.S. Pat. 3,252,889 to have application as a component of a catalytic cracking catalyst, and applications of said layered aluminosilicate as a component of a hydrocracking catalyst have been disclosed in the copending application of Joseph Jaffe for "Hydrotreating Catalyst and Process," Ser. No. 750,283 filed Aug. 5, 1968.

OBJECTS

In view of the foregoing, objects of the present invention include providing an improved hydrocracking catalyst that has, compared with similar prior art catalysts:

(1) high hydrocracking activity;
(2) improved hydrocracking selectivity;
(3) high nitrogen tolerance;
(4) high hydrocracking stability;
(5) a cracking component that is crystalline in structure, having pores elongated in two directions, contrary to the pores of crystalline zeolitic molecular sieves, and therefore having less reactant access limitations than the pores of such molecular sieves.

It is a further object of the present invention to provide a hydrocarcking process using said improved catalyst that is capable of producing excellent-quality gasoline and other valuable fuel products, and to provide methods of operating the hydrocracking process in an integrated manner with other process units to achieve various advantageous results.

The present invention will best be understood, and further objects and advantages thereof will be apparent, from the following description when read in connection with the accompanying drawing.

STATEMENT OF INVENTION

In accordance with the present invention, it has been found that the foregoing objects are achieved by a hydrocarbon conversion catalyst containing a unique combination of catalytic components, including a layered aluminosilicate component and at least one hydrogenating component selected from Group VIII metals and compounds thereof, said layered aluminosilicate having, prior to drying and calcining of said catalyst, the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $½O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

In preferred embodiments of the present invention, said catalyst further comprises a matrix comprising a siliceous gel and said hydrogenating component, and said layered aluminosilicate is in particulate form and is dispersed in said matrix, and preferably is substantially in the ammonia or hydrogen form and substantially free of any catalytic loading metal or metals.

Preferably, said catalyst, when it includes a matrix comprising a silica-alumina gel, will be further characterized by an average pore diameter below 100 angstroms and a surface area above 200 square meters per gram.

When said catalyst includes a matrix comprising a silica-alumina gel, said catalyst advantageously may comprise titanium, zirconium, thorium or hafnium or any combination thereof, in the form of metals, oxides, sulfides or any combination thereof, in an amount of 1 to 10 weight percent, perferably 5 to 9 weight percent, of said matrix, calculated as metal. Titanium, preferably in the form of titania, is preferred.

Said Group VIII component may be, for example, nickel, cobalt, platinum or palladium, in the form of the metal, oxide, sulfide or any combination thereof. When said catalyst does not include a matrix comprising a silica-alumina gel, said Group VIII component may be present in said catalyst in an amount of 0.4 to 15 weight percent calculated as metal and based on said layered aluminosilicate component. When said catalyst includes a matrix comprising a silica-alumina gel, said Group VIII component may be present in said catalyst in an amount of 0.01 to 15 weight percent, preferably 0.01 to 10 weight percent, calculated as metal and based on said matrix. When said Group VIII component is nickel, cobalt, or compounds thereof, preferably it will be present in said catalyst comprising a silica-alumina gel matrix in an amount of at least 5 weight percent, calculated as metal and based on said matrix. Platinum or palladium or compounds thereof when used in said catalyst will be present in lesser amounts than nickel or cobalt or compounds thereof.

Said catalyst advantageously may contain tin or a compound thereof, particularly when it also contains nickel or a compound thereof, regardless of whether said catalyst includes a matrix comprising a silica-alumina gel. The tin or compound thereof may be present in an amount of 0.5 to 30 weight percent, preferably 2 to 15 weight percent, based on said catalyst and calculated as metal, when said catalyst includes a matrix comprising a silica-alumina gel. When said catalyst does not include a matrix comprising a silica-alumina gel, the tin or compound thereof may be present in an amount of 0.2 to 15 weight percent, based on said catalyst and calculated as metal. When tin or a compound thereof is present, particularly in conjunction with nickel or a compound thereof, both the hydrocracking activity and the hydrogenation activity of said catalyst are higher, compared with the same catalyst with no tin or tin compound present. Further, when tin or a compound thereof is present, particularly in conjunction with nickel or a compound thereof, the hydrogenation activity of the catalyst can be controlled in an essentially reversible manner by varying the amount of sulfur present in the hydrocarbon feed.

When said catalyst includes a matrix comprising a silica-alumina gel, said layered aluminosilicate is present in said catalyst in an amount of 1 to 50 weight percent of said catalyst.

A particular embodiment of the catalyst of the present invention is a catalyst comprising:

(a) a gel matrix comprising a silica-alumina gel and at least one hydrogenating component selected from Group VIII metals and compounds thereof; and (b) a layered aluminosilicate component in particulate form;

said layered aluminosilicate having, prior to drying and calcining of said catalyst the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $½O^{--}$ and mixtures thereof, and is internal in the lattice, and $x$ is from 2.0 to 3.5 at 50% relative humidity, said mineral being characterized by a $d_{011}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; and said layered aluminosilicate component being dispersed through said gel matrix.

Another particular embodiment of the catalyst of the present invention is a catalyst comprising:

(A) A gel matrix comprising:

(a) at least 15 weight percent silica, (b) alumina, in an amount providing an alumina-to-silica weight ratio of 15/85 to 80/20, (c) at least one Group VIII component in the form of metal, oxide, sulfide or any combination thereof, in an amount of 0.01 to 15 weight percent, preferably 0.01 to 10 weight percent, of said matrix, calculated as metal;

(B) A layered aluminosilicate (preferably substantially in the ammonia or hydrogen form, substantially free of any catalytic loading metal or metals), said layered aluminosilicate having, prior to drying and calcining of said catalyst the empirical formula $$n\text{SiO}_2:\text{Al}_2\text{O}_3:m\text{AB}:x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of F⁻, OH⁻, ½O⁻⁻ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, said layered aluminosilicate further being in particulate form and being dispersed through said matrix.

Another particular embodiment of the catalyst of the present invention is a catalyst consisting essentially of:

(A) A porous Xerogel comprising:

(a) at least 15 weight percent silica,
(b) alumina, in an amount providing an alumina-to-silica weight ratio of 15/85 to 80/20,
(c) nickel, in the form of metal, oxide, sulfide or any combination thereof, in an amount of 0.01 to 15 weight percent, preferably 0.01 to 10 weight percent, of said Xerogel, calculated as metal,
(d) titanium oxide, in an amount of 1 to 10 weight percent, preferably 5 to 9 weight percent, of said Xerogel, calculated as metal;

(B) A layered aluminosilicate, in an amount of 1 to 50 weight percent of said catalyst, said layered aluminosilicate preferably being substantially in the ammonia or hydrogen form, and preferably being substantially free of any catalytic loading metal or metals, said layered aluminosilicate having, prior to drying and calcining of said catalyst the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of F⁻, OH⁻, ½O⁻⁻ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations, said layered aluminosilicate further being in the form of particles, said particles being dispersed through said Xerogel; said catalyst having a pore diameter below 100 angstroms and a surface area above 200 square meters per gram.

The reference to a layered aluminosilicate component "substantially free of any catalytic loading metal or metals" means that the layered aluminosilicate component contains no more than 0.5 weight percent of catalytic metal or metals, based on that component. The catalytic metal or metals include the Group VIII metals and exclude sodium.

It will be noted that the weight ratio of catalytic metal in the matrix portion of the catalyst to catalytic metal in the layered aluminosilicate portion of the catalyst is high, in the catalyst embodiments which include a matrix comprising a silica-alumina gel, in which is dispersed a layered aluminosilicate substantially free of any catalytic loading metal or metals.

The catalyst, whether or not it includes a matrix comprising a silica-alumina gel, advantageously may comprise combined fluorine, in an amount of 0.1 to 10 weight percent fluorine, based on the final catalyst. The fluorine has particular advantages in increasing the catalytic efficacy of the layered aluminosilicate component of the catalyst. The fluorine may be incorporated into the catalyst in any conventional manner that will result in a substantially uniform distribution of combined fluorine on or through the other catalyst components. A preferred manner of incorporating the fluorine in the catalyst is by the addition of a soluble fluoride compound, for example sodium fluoride, ammonium fluoride, ammonium bifluoride or hydrofluoric acid. The fluoride compound may be combined with the other catalyst components at any of various stages of catalyst preparation. When the catalyst includes a matrix comprising a siliceous gel, the fluoride compound may be formed with the matrix as a component thereof.

Still further in accordance with the present invention, there is provided a hydrocracking process which comprises contacting a hydrocarbon feedstock containing substantial amounts of materials boiling above 200° F. and selected from the group consisting of petroleum distillates, solvent-deasphalted petroleum residua, shale oils and coal tar distillates, in a reaction zone with hydrogen and the catalyst described above, at hydrocracking conditions, including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of said feedstock, and recovering from said reaction zone valuable products, including gasoline. The hydrocarbon feedstock preferably contains less than 1000 p.p.m. organic nitrogen. A prior hydrofining step may be used, if desired, to reduce the feed nitrogen content to the preferred level; however, because of the superior nitrogen tolerance of the layered aluminosilicate component, compared with silica-alumina, the hydrofining step need not accomplish complete nitrogen content reduction, as further discussed hereinafter.

Further in accordance with the present invention, advantageous results are obtained by providing in the reaction zone, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina. Further in accordance with the present invention, said separate second catalyst may be located in said reaction zone in a bed disposed above said catalyst comprising a layered aluminosilicate cracking component. In the embodiments of the present invention discussed in this paragraph, no other prior hydrofining step generally will be necessary, because hydrofining is accomplished in one reaction zone concurrently with hydrocracking, together with some hydrogenation of aromatics.

Still further in accordance with the present invention, there is provided a hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof, and a component selected from the group consisting of alumina and silica-alumina, the catalyst of said second bed comprising the layered aluminosilicate-containing catalyst of the present invention, maintaining said first bed of catalyst and said second bed of catalyst at a temperature in the range 400° to 950° F. and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent of said second bed of catalyst.

The hydrocracking zone of the process of the present invention may be operated once through, or advantageously may be operated by recycling thereto materials from the effluent thereof that boil above 200° F., preferably above 400° F. All or a portion of these heavier materials advantageously may be catalytically cracked. The heavy gasoline fraction from the hydrocracking zone advantageously may be catalytically reformed.

HYDROCARBON FEEDSTOCKS

The feedstocks supplied to the hydrocracking zone containing a catalyst comprising a layered aluminosilicate in the process of the present invention are selected from the group consisting of petroleum distillates, solvent-deasphalted petroleum residua, shale oils and coal tar distillates. The feedstocks contain substantial amounts of materials boiling above 200° F., preferably substantial amounts of materials boiling in the range 350° to 950° F., and more preferably in the range 400° to 900° F. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, shale and coal tar. As discussed hereinafter, the feedstocks may have been subjected to a hydrofining and/or hydrogenation treatment, which may have been accompanied by some hydrocracking, before being supplied to the hydrocracking zone containing the catalyst comprising a layered aluminosilicate.

NITROGEN CONTENT OF FEEDSTOCK

While the process of the present invention can be practiced with utility when supplying to the hydrocracking zone containing the catalyst comprising a layered aluminosilicate, hydrocarbon feeds containing relatively large quantities of organic nitrogen, for example several thousand parts per million organic nitrogen, it is preferred that the organic nitrogen content be less than 1000 parts per million organic nitrogen. A preferred range is 0.5 to 1000 parts per million; more preferably, 0.5 to 100 parts per million. As previously discussed, a prior hydrofining step may be used, if desired, to reduce the feed nitrogen content to the preferred level. The prior hydrofining step advantageously may also accomplish hydrogenation and a reasonable amount of hydrocracking. Because of the superior tolerance of the layered aluminosilicate component for organic nitrogen compounds, compared with silica-alumina, the hydrofining step need not accomplish complete organic nitrogen content reduction. Further, because of the superior tolerance of the layered aluminosilicate component for ammonia, compared with silica-alumina, and because the layered aluminosilicate component is more tolerant of ammonia than of organic nitrogen compounds, ammonia produced in the hydrofining zone either may be removed from the system between the hydrofining zone and the hydrocracking zone containing the hydrocracking catalyst comprising a layered aluminosilicate, or may be permitted to pass into the hydrocracking zone along with the feed thereto.

SULFUR CONTENT OF FEEDSTOCKS

While the process of the present invention can be practiced with utility when supplying to the hydrocracking zone containing a catalyst comprising a layered aluminosilicate, hydrocarbon feeds containing relatively large quantities of organic sulfur, it is preferable to maintain the organic sulfur content of the feed to that zone in a range of 0 to 3 weight percent, preferably 0 to 1 weight percent.

CATALYST COMPRISING A LAYERED ALUMINOSILICATE COMPONENT AND PREPARATION THEREOF

(A) General

The layered aluminosilicate component used in preparing the hydrocracking catalyst may be any catalytically active layered aluminosilicate, although the synthetic layered aluminosilicate of Granquist U.S. Pat. 3,252,757 is preferred. The mineral becomes dehydrated during drying and calcination of the catalyst as in the examples herein.

(B) Method of preparation when catalyst does not include a matrix comprising a siliceous gel In the case wherein the Group VIII metal or a compound thereof is added directly to the layered aluminosilicate cracking component, impregnation using an aqueous solution of a suitable Group VIII metal compound is the preferred method of incorporating the Group VIII metal or compound thereof with the layered aluminosilicate. Ion exchange methods whereby the Group VIII component is incorporated into the layered aluminosilicate by exchanging the Group VIII component with a metal component already present in the layered aluminosilicate may be used.

(C) Method of preparation when catalyst includes a matrix comprising a siliceous gel When the catalyst includes a matrix comprising a siliceous gel, the layered aluminosilicate component may be dispersed therein by cogelation of the matrix around said layered aluminosilicate component, and the resulting composite may be impregnated with the desired hydrogenating component, using an aqueous solution of the hydrogenating component.

The layered aluminosilicate component, substantially in the ammonia or hydrogen form, may be maintained substantially free of any catalytic loading metal or metals, in accordance with a preferred embodiment of the present invention, by dispersing it in a slurry of the precursors of the siliceous gel matrix at a pH of 5 or above. When sodium forms of layered aluminosilicates are starting materials, they may be converted to the ammonia or hydrogen form by ion exchange prior to being combined with the other catalyst components. Alternatively, they may be combined with the other catalyst components and then converted to the ammonia or hydrogen form by ion exchange. In either case, the layered aluminosilicate component should not be combined with the precursors of the other catalyst components at a pH below 5, if catalytic metal loading is to be avoided.

(D) Sulfiding

The finished catalyst may be sulfided in a conventional manner prior to use, if desired. If not presulfided, the catalyst will tend to become sulfided during process operation from any sulfur compounds that may be present in the hydrocarbon feed.

(E) Fluoriding

Incorporation of fluorine in the catalyst has been discussed above.

SEPARATE HYDROFINING CATALYST

(A) General

As previously indicated, advantageous results are obtained by providing in the reaction zone containing the hydrocracking catalyst comprising a layered aluminosilicate a separate second catalyst comprising a hydrogenating component selected from Group VI metals and compounds thereof, a hydrogenating component selected from Group VIII metals and compounds thereof, and a support selected from the group consisting of alumina and silica-alumina. Pellets or other particles of this separate second catalyst may be physically mixed with the hydrocracking catalyst comprising a layered aluminosilicate, but preferably are disposed in a separate catalyst bed located ahead of the hydrocracking catalyst in the same reactor shell, eliminating interstage condensation, pressure letdown and ammonia and hydrogen sulfide removal. In a preferred arrangement using downflow of hydrocarbon feed, the bed of separate second catalyst is located above the hydrocracking catalyst in the same reactor shell.

Where said separate second catalyst is located in the same reactor shell as the hydrocracking catalyst containing a layered aluminosilicate, it is preferably present in an amount in the range of 10 to 40 volume percent of the total amount of catalyst in the reactor.

In an arrangement less preferred than the ones discussed above in this section, the separate second catalyst may be located in a separate hydrofining reactor, operated under conventional hydrofining conditions, from the effluent of which ammonia or hydrogen sulfide, or both, and also hydrocarbon products, if desired, may be removed prior to hydrocracking the remaining hydrofined feedstock in a subsequent hydrocracking reactor.

In any of the arrangements discussed in this section, the separate second catalyst preferably has hydrofining activity and hydrogenation activity, and even more preferably also has enough hydrocracking activity to convert 0.2 to 50, preferably 5 to 20, weight percent of the hydrocarbon feedstock to products boiling below the initial boiling point of the feedstock in a single pass. The hydrogenation activity preferably is sufficient to saturate or partially saturate a substantial portion of the organic oxygen, nitrogen and sulfur compounds in the feed to water, ammonia, and hydrogen sulfide.

Preferably, said separate second catalyst contains nickel or cobalt or compounds thereof in an amount of 1 to 15 weight percent, calculated as metal, and molybdenum or tungsten or compounds thereof in an amount of 5 to 30 weight percent, calculated as metal, with the remainder of the catalyst consisting of alumina, or silica-alumina containing up to 50 weight percent silica.

Particularly preferred examples of said separate second catalyst, comprising silica-alumina, are:

|     | Percent by weight of total catalyst, calculated as metal | | | $SiO_2/Al_2O_3$ weight ratio |
|-----|------|-------|-------|----------|
|     | Ni   | Mo    | W     |          |
| (1) | 4-10 | 15-25 |       | 10/90-30/70 |
| (2) | 6-15 |       | 15-30 | 30/70-50/50 |

It has been found that use of said separate second catalyst increases the gasoline yield from the hydrocracking stage containing a catalyst comprising a layered aluminosilicate, compared with the gasoline yield from the hydrocracking stage when the identical feed thereto has not been first or concurrently processed in the presence of said separate second catalyst. The increased gasoline yield probably is related to the hydrogenation, in that more saturated hydrocarbon structures tend to crack more easily.

(B) Method of preparation

Said separate second catalyst may be prepared by any conventional preparation method, including impregnation of an alumina or silica-alumina support with salts of the desired hydrogenating component, or cogelation of all components, with the latter method being preferred.

The hydrocracking catalyst comprising a layered aluminosilicate has activity and stability advantages over a conventional hydrocracking catalyst. It has been found that use of said separate second catalyst in the above-described arrangements further increases the stability of the hydrocracking catalyst containing a layered aluminosilicate, compared with the stability of the latter catalyst when the identical feed thereto has not been first or concurrently processed in the presence of said separate second catalyst.

OPERATING CONDITIONS

The hydrocracking zone containing the catalyst comprising a layered aluminosilicate is operated at hydrocracking conditions including a temperature in the range 400° to 950° F., preferably 500 to 850° F., a pressure in the range 800 to 3500 p.s.i.g., preferably 1000 to 3000 p.s.i.g., a liquid hourly space velocity in the range 0.1 to 5.0, preferably 0.5 to 5.0, and more preferably 0.5 to 3.0. The total hydrogen supply rate (makeup and recycle hydrogen) to said zone is 200 to 20,000 s.c.f., preferably 2000 to 20,000 s.c.f., of hydrogen per barrel of said feedstock.

Where a separate hydrofining zone, which also may accomplish hydrogenation and some hydrocracking, is located ahead of the hydrocracking zone containing a catalyst containing a layered aluminosilicate, the operating conditions in the separate hydrofining zone include a temperature of 400° to 900° F., preferably 500° to 800° F., a pressure of 800 to 3500 p.s.i.g., preferably 1000 to 2500 p.s.i.g., and a liquid hourly space velocity of 0.1 to 5.0, preferably 0.5 to 3.0. The total hydrogen supply rate (makeup and recycle hydrogen) is 200 to 20,000 s.c.f. of hydrogen per barrel of feedstock, preferably 2000 to 20,000 s.c.f. of hydrogen per barrel of feedstock.

Where a separate bed of hydrofining catalyst is located above a bed of the hydrocracking catalyst containing a layered aluminosilicate in the same reactor shell, the space velocity through the bed of hydrofining catalyst will be a function of the space velocity through the hydrocracking catalyst bed and the amount of hydrofining catalyst expressed as a volume percent of the total catalyst in the reactor. For example, where the hydrofining catalyst is 5 volume percent of the total catalyst in the reactor, and the space velocity through the bed of hydrocracking catalyst is 0.9, the space velocity through the bed of hydrofining catalyst will be 2.7. Accordingly, the space velocity through the bed of hydrofining catalyst in the process of the present invention may range from 0.15 to 45.0.

The operating conditions in the reforming zone and catalytic cracking zone employed in various embodiments of the present invention are conventional conditions known in the art.

PROCESS OPERATION WITH REFERENCE TO DRAWING

Figures 1, 2:
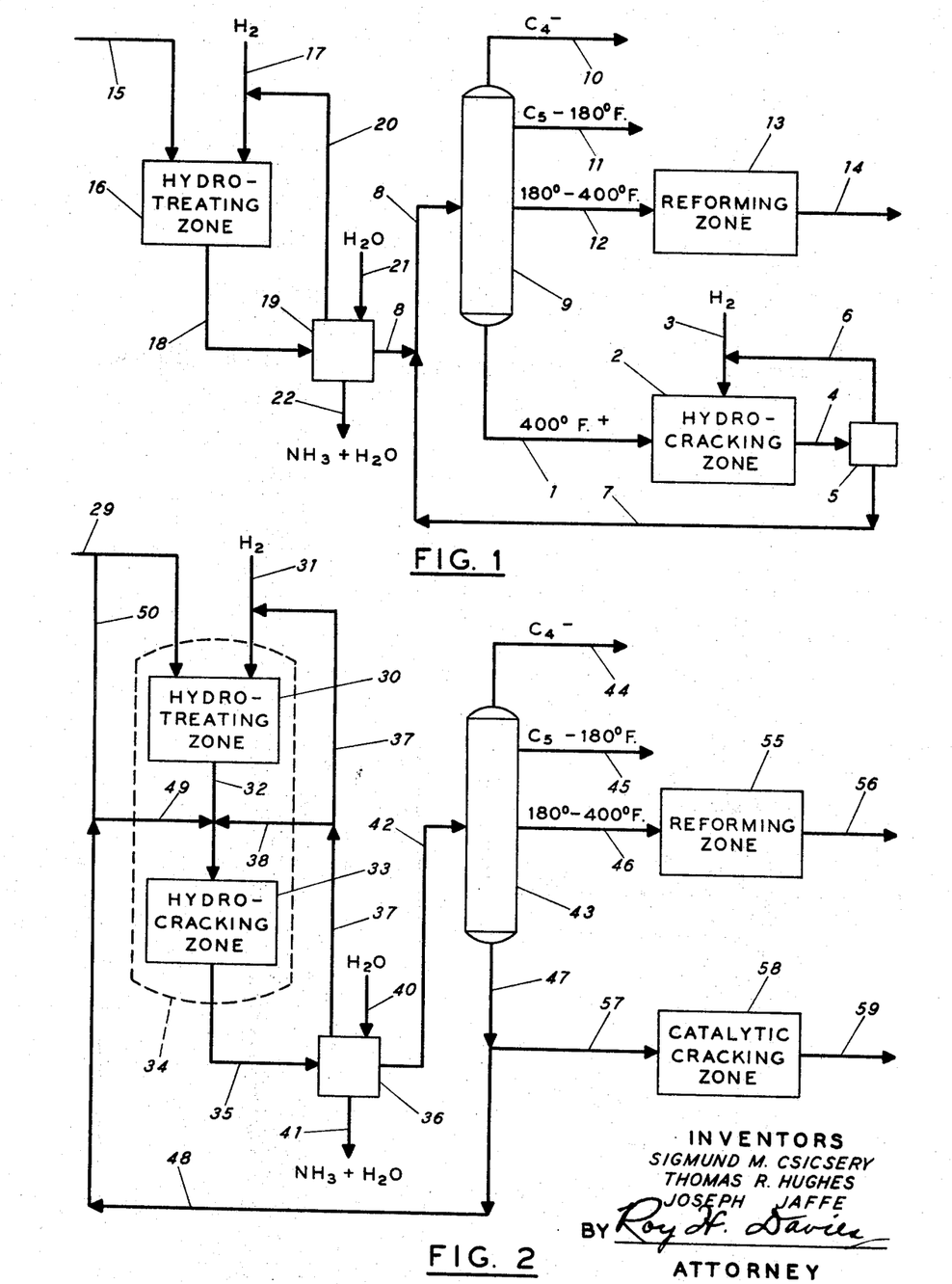
FIG. 1 is a diagrammatic illustration of apparatus and flow paths suitable for carrying out the process of several of the embodiments of the present invention, including embodiments wherein a hydrofining zone precedes the hydrocracking zone, and embodiments is catalytically re-formed.
FIG. 2 is a diagrammatic illustration of apparatus and flow paths suitable for carrying out the process of additional embodiments of the present invention, including embodiments wherein a hydrofining zone precedes a hydrocracking zone in a single reactor shell, and embodiments wherein a selected fraction from the hydrocracking zone is catalytically cracked.

Referring now to FIG. 1 of the drawing, in accordance with a primary embodiment of the present invention, a hydrocarbon feedstock as previously described, which in this case may boil above 400° F., is passed through line 1 into hydrocracking zone 2, which contains a hydrocracking catalyst comprising a layered alumino-silicate component and a nickel hydrogenation component. As previously discussed, the layered aluminosilicate component may be dispersed in a matrix of other catalyst components, and the hydrogenating component may be located substantially entirely in the matrix. Also as previously discussed, a separate second catalyst, previously described, may be located in hydrocracking zone 2. The feedstock is hydrocracked in hydrocracking zone 2 at conditions previously discussed, in the presence of hydrogen supplied through line 3. From hydrocracking zone 2 an effluent is withdrawn through line 4, hydrogen is separated therefrom in separator 5, and hydrogen is recycled to hydrocracking zone 2 through line 6. From separator 5, hydrocracked materials are passed through lines 7 and 8 to distillation column 9, where they are separated into fractions, including a $C_4^-$ fraction which is withdrawn through line 10, a $C_5$–180° F. fraction which is withdrawn through line 11, and a 180°–400° F. fraction which is withdrawn through line 12.

Still referring to FIG. 1, in accordance with another embodiment of the present invention, the 180°–400° F.

fraction in line 12 is reformed under conventional catalytic reforming conditions in reforming zone 13, from which a catalytic reformate is withdrawn through line 14.

Still referring to FIG. 1, in accordance with another embodiment of the present invention, a hydrocarbon feedstock which is to be hydrofined and/or hydrogenated, and partially hydrocracked, if desired, in a separate hydrotreating zone prior to being hydrocracked in hydrocracking zone 2, is passed through line 15 to hydrotreating zone 16 containing a catalyst, as previously described, having hydrofining and/or hydrogenation activity. The feedstock is hydrotreated in zone 16 at conditions previously described, in the presence of hydrogen supplied through line 17. The effluent from hydrotreating zone 16 is passed through line 18 to separation zone 19, from which hydrogen separated from the treated feedstock is recycled through line 20 to hydrotreating zone 16. In zone 19, water entering through line 21 is used to scrub ammonia and other contaminants from the incoming hydrocarbon stream, and the ammonia, water and other contaminants are withdrawn from zone 19 through line 22.

Referring now to FIG. 2, a hydrocarbon feedstock, as previously described, which in this case may boil above 400° F., is passed through line 29 to hydrotreating zone 30 containing a catalyst, as previously described, having hydrofining and/or hydrogenation activity. The feedstock is hydrofined and/or hydrogenated, and partially hydrocracked, if desired, in zone 30, at conditions previously described, in the presence of hydrogen supplied through line 31. The effluent from zone 30 is passed through line 32, without intervening impurity removal, into hydrocracking zone 33, where it is hydrocracked in the presence of a hydrocracking catalyst comprising a layered aluminosilicate cracking component and a nickel hydrogenating component. Said catalyst may contain other catalytic components, and a separate second catalyst may be present in zone 33, as described in connection with zone 2 in FIG. 1. Hydrotreating zone 30 and hydrocracking zone 33 may be located in separate reactor shells, which may be operated at different pressures. Alternatively, and in a preferred manner of operation, hydrotreating zone 30 and hydrocracking zone 33 may be separate catalyst beds located in a single pressure shell 34, and the effluent from zone 30 may be passed to zone 33 without intervening pressure letdown, condensation or impurity removal. The effluent from zone 33 is passed through line 35 to separation zone 36, from which hydrogen is recycled through line 37 to hydrotreating zone 30. All or a portion of the recycled hydrogen may be passed through line 38 to hydrocracking zone 33, if desired. In separation zone 36, water entering through line 40 is used to scrub ammonia and other contaminants from the incoming hydrocarbon stream, and the ammonia, water and other contaminants are withdrawn from zone 36 through line 41. The effluent from zone 36 is passed through line 42 to distillation column 43, where it is separated into fractions, including a $C_4^-$ fraction which is withdrawn through line 44, a $C_5$–180° F. fraction which is withdrawn through line 45, a 180°–400° F. fraction which is withdrawn through line 46, and a fraction boiling above 400° F. which is withdrawn through line 47. The fraction in line 47 may be recycled through lines 48 and 49 to hydrocracking zone 33. All or a portion of the fraction in line 48 may be recycled to hydrotreating zone 30 through line 50, if desired.

Still referring to FIG. 2, in accordance with another embodiment of the present invention, the 180°–400° F. fraction in line 46 may be passed to a catalytic reforming zone 55, where it may be reformed in the presence of a conventional catalytic reforming catalyst under conventional catalytic reforming conditions to produce a catalytic reformate, which is withdrawn from zone 55 through line 56.

Still referring to FIG. 2, in another embodiment of the present invention, all or a portion of the fraction in line 47 may be passed through line 57 to catalytic cracking zone 58, which may contain a conventional catalytic cracking catalyst and which may be operated under conventional catalytic cracking conditions, and from which a catalytically cracked effluent may be withdrawn through line 59.

EXAMPLES

The following examples are given for the purpose of further illustrating the practice of the process of the present invention. However, it is to be understood that these examples are given by way of exemplification only, and are not intended in any way to limit the scope of the present invention.

EXAMPLE 1

A layered aluminosilicate-nickel catalyst (Catalyst A) in accordance with the present invention was prepared in the following manner.

These starting materials were used:

(1) 600 grams of a layered clay-type aluminosilicate in finely divided form;

(2) 200 grams of nickel nitrate, $Ni(NO_3)_2 \cdot 6H_2O$, dissolved in 665 ml. of $H_2O$.

The layered aluminosilicate, in powder form, was mixed with the nickel nitrate solution, followed by addition of an additional 100 ml. $H_2O$ and further mixing, to form a pasty mass. The pasty mass was dried in a vacuum oven for 6 hours at room temperature, then 200°–250° F. for approximately 16 hours. The resulting dried material was broken into 8–16 mesh particles. The particles were calcined in flowing dry air for 4 hours at 460° F., then for 4 hours at 900° F. The resulting catalyst upon analysis was found to contain 8.0 weight percent nickel, calculated as metal, and was found to have a density of 0.94 gram/ml. and a BET nitrogen surface area of 123 m.$^2$ per gram.

EXAMPLE 2

A layered aluminosilicate-palladium catalyst (Catalyst B) in accordance with the present invention was prepared in the following manner.

These starting materials were used:

(1) 500 grams of a layered clay-type aluminosilicate in finely divided form.

(2) 6.8 grams of tetra ammino palladium nitrate $[Pd(NH_3)_4](NO_3)_2$, dissolved in 700 ml. of $H_2O$.

The layered aluminosilicate in powder form was mixed with the tetra ammino palladium nitrate solution, to form a pasty mass. The pasty mass was dried in a vacuum oven for 6 hours at room temperature, then at 200°–250° F. for approximately 16 hours. The resulting material was tabletted, and then calcined in flowing dry air for 4 hours at 460° F., then for 4 hours at 900° F. The resulting catalyst upon analysis was found to contain 0.5 weight percent palladium, calculated as metal.

EXAMPLE 3

A layered aluminosilicate-palladium catalyst (Catalyst C) in accordance with the present invention was prepared in the following manner.

These starting materials were used:

(1) 500 grams of a layered clay-type aluminosilicate in finely divided form;

(2) 4.24 grams of palladium chloride, $PdCl_2$, dissolved in 700 ml. $H_2O$, containing a few drops of concentrated hydrochloric acid.

The layered aluminosilicate in powder form was impregnated with the palladium chloride solution, and the resulting catalyst was dried and calcined, as in Example 2. The resulting catalyst upon analysis was found to contain 0.5 weight percent palladium, calculated as metal.

EXAMPLE 4

A cogelled catalyst (Catalyst D) of the following composition is prepared:

| Component: | Weight percent of total catalyst |
|---|---|
| NiO | 11 |
| $TiO_2$ | 9 |
| $Al_2O_3$ | 36 |
| $SiO_2$ | 26 |
| Layered aluminosilicate | 18 |
| Total | 100 |

The catalyst is prepared by the following steps, using sufficient quantities of the various starting materials to produce the above-indicated weight percentages of the components of the final catalyst:

(1) An aqueous acidic solution is prepared, containing $AlCl_3$, $TiCl_4$, $NiCl_2$ and acetic acid.

(2) Two alkaline solutions are prepared: (1) a sodium silicate solution; and (2) an ammonia solution containing sufficient excess ammonia so that upon combining the alkaline solutions with the acidic solution coprecipitation of all of the metal-containing components of the solutions will occur at a neutral pH of about 7.

(3) The acidic and alkaline solutions are combined, and coprecipitation of all of the metal-containing components of the solutions occurs at a pH of about 7, resulting in a slurry.

(4) The layered synthetic crystalline clay-type aluminosilicate in finely divided form is added to the slurry.

(5) The layered aluminosilicate-containing slurry is filtered to produce a layered aluminosilicate-containing hydrogel filter cake, which is washed repeatedly with dilute ammonium acetate solution, to remove sodium and chloride ionic impurities from both the hydrogel and the layered aluminosilicate contained therein.

(6) The layered aluminosilicate-containing hydrogel is dried in an air-circulating oven and then is activated in flowing air for 5 hours at 950° F.

The finished catalyst is characterized by a surface area above 300 m.$^2$/g., a pore volume of about 0.4 cc./g., and an average pore diameter of about 40 angstroms (A.), and a layered aluminosilicate component substantially free of catalytic metals; that is, substantially all of the nickel and titanium contained in the catalyst is located in the gel portion of the catalyst rather than in the layered aluminosilicate component thereof.

EXAMPLE 5

A comparison cogelled catalyst (Catalyst E) is prepared exactly as in Example 4, except that a Linde sodium "Y" crystalline zeolitic molecular sieve component in finely divided form is used instead of a layered aluminosilicate, and prior to incorporation in the slurry the molecular sieve is presoaked in an ammoniacal solution of $NiCl_2$, to load the molecular sieve with nickel. The amounts of starting materials are selected to provide a final catalyst containing the same weight percentages of components as the catalyst of Example 4.

The catalyst thus differs from the catalyst of Example 4 only in that it contains a molecular sieve component instead of a layered aluminosilicate component, and the nickel contained in the catalyst is located both in the gel component and in the molecular sieve component.

EXAMPLE 6

A cogelled catalyst (Catalyst F) is prepared exactly as in Example 4, except that no layered aluminosilicate component is incorporated therein. The amounts of starting materials are selected to provide a final catalyst with approximately the same proportions of non-layered aluminosilicate components as the catalyst of Example 4. The composition of the final catalyst is:

| Component: | Weight percent of total catalyst |
|---|---|
| NiO | 13 |
| $TiO_2$ | 11 |
| $Al_2O_3$ | 44 |
| $SiO_2$ | 32 |
| Total | 100 |

It will be noted that the weight percentage of each non-layered-aluminosilicate component or non-molecular sieve component of Catalysts D and E is approximately 82% of the weight percentage of the same component of Catalyst F, the additional 18 weight percent of Catalysts D and E being contributed by the layered aluminosilicate component or molecular sieve component.

EXAMPLE 7

Portions of Catalysts D, E and F of Examples 4, 5 and 6, respectively, are separately used to hydrocrack separate portions of a California gas-oil feedstock, on a once-through basis.

The gas-oil feedstock has the following characteristics:

Boiling range, ° F.—500–900
Gravity, ° API—19
Organic nitrogen content, p.p.m.—3000

The hydrocracking conditions are:

Total pressure, p.s.i.g.—2500
Total hydrogen rate, s.c.f./bbl.—10,000
Liquid hourly space velocity, v./v./hr.—0.8
Per-pass conversion to products boiling below 550° F., vol. percent—60
Starting temperature, ° F.—As indicated below.

The hydrocracking activities of the three catalysts, as measured by the starting temperatures necessary to achieve the indicated per-pass conversion, are:

| Catalyst | Starting T, ° F. |
|---|---|
| D | 751 |
| E | 751 |
| F | 773 |

The yield of 300°–550° F. jet fuel is higher with Catalyst D than with Catalyst E.

From this example, it appears that: (1) the layered aluminosilicate-containing and molecular sieve-containing gel catalysts (Catalysts D and E) have hydrocracking activity superior to that of a catalyst (Catalyst F) that does not contain a layered aluminosilicate component but that is otherwise substantially identical; (2) the gel catalyst (Catalyst D) containing a non-metal-loaded layered aluminosilicate component has hydrocracking activity equal to that of a gel catalyst (Catalyst E) that is substantially identical except that contains a metal-loaded molecular sieve component and no layered aluminosilicate component; and (3) the catalyst comprising a layered aluminosilicate (Catalyst D) has a superior selectivity for the production of jet fuel than a similar catalyst (Catalyst E) containing a crystalline zeolitic molecular sieve component rather than a layered aluminosilicate component.

EXAMPLE 8

The catalyst of Example 1 is used to hydrocrack a light cycle oil hydrocarbon feedstock of the following description:

| | |
|---|---|
| Gravity, ° API | 19.5 |
| Aniline point, ° F. | 62 |
| Sulfur content, weight percent | 0.43 |
| Nitrogen content, p.p.m. | 330 |
| Aromatics content, liquid volume percent | 70 |

Boiling range, D-1160 distillation:

| | |
|---|---|
| ST/5 | 381/471 |
| 10/30 | 492/532 |
| 50 | 568 |
| 70/90 | 598/635 |
| 95/EP | 648/681 |

The hydrocracking is accomplished, on a once-through basis, at an average catalyst temperature of 732° F., a pressure of 2100 p.s.i.g., a liquid hourly space velocity of 0.9, and a hydrogen supply rate of 12,000 s.c.f. per barrel of hydrocarbon feedstock. The hydrogen consumption is 2000 s.c.f. per barrel of hydrocarbon feedstock.

The product distribution is as follows:

| | Weight percent |
|---|---|
| $C_1$ | 0.1 |
| $C_2$ | 0.3 |
| $C_3$ | 2.8 |
| $iC_4$ | 4.6 |
| $nC_4$ | 4.4 |
| $C_5$–180° F. | 10.7 |
| 180°–400° F. | 34.1 |
| 400° F.+ | 45.8 |

The 180°–400° F. portion of the product is characterized by a gravity of 39.7° API and by a paraffin/naphthene/aromatic ratio of 15/35/50.

The 400° F.+ portion of the product is characterized by a gravity of 30.5° API and by an aniline point of 98.0° F.

EXAMPLE 9

The 180°–400° F. portion of the product of Example 8 is catalytically reformed, using a conventional reforming catalyst and conventional reforming conditions, and is found to be a superior feedstock for this operation. The catalytic reformate is combined with the $C_5$–180° F. portion of the product of Example 8, to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 58 liquid volume percent of the light cycle oil feedstock hydrocracked in Example 8. I.e., in this operation a 58 liquid volume percent yield, based on the hydrocracking zone feed, of a 91 F–1 Clear gasoline having a Reid Vapor Pressure of 10, is obtained.

EXAMPLE 10

The 400° F.+ portion of the product of Example 8, characterized by a gravity of 30.5° API and by an aniline point of 98.0° F., is recycled to the catalytic cracking unit which produced the light cycle oil feed used in Example 8. This upgrades the total feed to the catalytic cracking unit, and causes decreased coke production and increased gasoline production in that unit. These improved results are made possible because of the improved characteristics of the 400° F.+ materials recycled from the hydrocracking zone to the catalytic cracking unit, compared with the approximately 400° F.+ light cycle oil supplied to the hydrocracking zone from the catalytic cracking unit:

| | Gravity, °API | Aniline Point, ° F. |
|---|---|---|
| Feed to hydrocracking zone | 19.5 | 62 |
| 400° F.+ recycle from hydrocracking zone to catalytic cracking unit | 30.5 | 98 |

EXAMPLE 11

A catalyst prepared exactly as in Example 1, and having the same composition as the catalyst of Example 1, is used to hydrocrack another portion of the same light cycle oil hydrocarbon feedstock described in Example 8.

The hydrocracking is accomplished on a recycle basis, that is, with the 400° F.+ portion of the product being recycled to the hydrocracking zone, at an average catalyst temperature of 761° F., a total pressure of 2100 p.s.i.g., a liquid hourly space velocity of 0.9, and a total hydrogen supply rate of 5500 s.c.f. per barrel of hydrocarbon feedstock.

The product distribution is as follows:

| | Weight percent |
|---|---|
| $C_1$ | 0.1 |
| $C_2$ | 1.2 |
| $C_3$ | 7.5 |
| $iC_4$ | 9.6 |
| $nC_4$ | 7.2 |
| $C_5$–180° F. | 21.8 |
| 180°–400° F. | 56.5 |

The 180°–400° F. portion of the product is characterized by a gravity of 40.9° API and by a paraffin/naphthene/aromatic ratio of 17/31/52.

EXAMPLE 12

The 180°–400° F. portion of the product of Example 11 is catalytically reformed, using a conventional reforming catalyst and conventional reforming conditions, and is found to be a superior feedstock for this operation. The catalytic reformate is combined with the $C_5$–180° F. portion of the product of Example 11, to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 105 liquid volume percent of the light cycle oil feedstock hydrocracked in Example 11. I.e., in this operation a 105 liquid volume percent yield, based on the hydrocracking zone light cycle oil feed, of 91 F–1 Clear gasoline having a Reid Vapor Pressure of 10, is obtained.

EXAMPLE 13

A first bed of hydrocracking catalyst prepared exactly as in Example 1, and having the same composition as the catalyst of Example 1, is placed in a reactor. A second bed of catalyst is placed in the reactor above the first bed. The volume of the second bed is 25% of the total catalyst volume. The catalyst in the second bed, prepared by impregnation of metals on silica-alumina pellets, has the following composition.

| | Weight percent |
|---|---|
| NiO | 7.6 |
| $MoO_3$ | 27.0 |
| $SiO_2$ | 14.4 |
| $Al_2O_3$ | 51.0 |

Another portion of the same light cycle oil feedstock described in Example 8 is passed downwardly through both catalyst beds in the reactor together with added hydrogen, the hydrogen and cycle oil sequentially contacting the catalyst beds, with no product or impurity removal between beds, at the following conditions:

| | |
|---|---|
| Average catalyst temperature, ° F. | 720 |
| Pressure, p.s.i.g. | 1300 |
| Hydrogen supply rate, s.c.f. per barrel of hydrocarbon feedstock | 5600 |
| Liquid hourly space velocity of hydrocarbon feedstock through upper bed, v./v./hr. | 2.7 |
| Liquid hourly space velocity of hydrocarbon feedstock through lower bed, v./v./hr. | 0.9 |
| Per-pass conversion to products boiling below 400° F., liquid volume percent | 80.0 |

The portion of the product boiling above 400° F. is recycled to the reactor. The hydrogen consumption is 3500 s.c.f. per barrel of hydrocarbon feedstock (fresh plus recycle feedstock).

The product distribution of the 400° F.− product is as follows:

| | Weight percent |
|---|---|
| $C_1$ | 0.1 |
| $C_2$ | 0.4 |
| $C_3$ | 2.6 |
| $iC_4$ | 5.8 |
| $nC_4$ | 3.4 |
| $C_5$–400° F. | 91.5 |

EXAMPLE 14

The 180°–400° F. portion of the product of Example 13 is catalytically reformed, using a conventional reforming catalyst and conventional reforming conditions, and is found to be a superior feedstock for this operation. The catalytic reformate is combined with the $C_5$–180° F. portion of the product of Example 13 to produce a gasoline pool. When $C_4$ hydrocarbons are blended into this gasoline pool in an amount sufficient to provide a pool Reid Vapor Pressure of 10, while conducting the reforming to provide a 91 F–1 Clear pool octane number, the total gasoline pool is 117 liquid volume percent of the light cycle oil feedstock hydrocracked in Example 13. I.e., in this operation a 117 liquid volume percent yield, based on the fresh hydrocarbon feed to the reactor in Example 13, of a 91 F–1 Clear gasoline having a Reid Vapor Pressure of 10, is obtained.

EXAMPLE 15

A catalyst prepared exactly as in Example 2, and having the same composition as the catalyst of Example 2, is used to hydrocrack another portion of the same light cycle oil hydrocarbon feedstock described in Example 8.

The hydrocracking is accomplished on a recycle basis, that is, with the 400° F.+ portion of the product being recycled to the hydrocracking zone, at an average catalyst temperature of 734° F., a total pressure of 1400 p.s.i.g., a liquid hourly space velocity of 1.2, a total hydrogen supply rate of 12,500 s.c.f. per barrel of hydrocarbon feedstock, and a chemical hydrogen consumption of 3000 s.c.f. per barrel of hydrocarbon feedstock.

The product distribution is as follows:

| | Weight percent |
|---|---|
| $C_1$ | 0.1 |
| $C_2$ | 0.5 |
| $C_3$ | 3.4 |
| $iC_4$ | 9.3 |
| $nC_4$ | 4.2 |
| $C_5$–180° F. | 23.9 |
| 180°–400° F. | 63.4 |

EXAMPLE 16

The run of Example 13 was repeated exactly, except using the catalyst of Example 1 unaccompanied in the reactor by a bed of hydrogenation catalyst. The average catalyst temperature needed to obtain the same per-pass conversion was 810° F., compared with 720° F. in Example 13, thereby indicating that the process of the present invention may be further improved by hydrotreating the feedstock prior to hydrocracking it in the presence of the layered aluminosilicate catalyst of the present invention.

Although only specific embodiments of the present invention have been described, numerous variations can be made in these embodiments without departing from the spirit of the invention, and all such variations that fall within the scope of the appended claims are intended to be embraced thereby.

What is claimed is:

1. A hydrocarbon conversion catalyst comprising a layered crystalline clay-type aluminosilicate component, said layered aluminosilicate having, prior to drying and calcining of said catalyst the empirical formula $$n\mathrm{SiO}_2 : \mathrm{Al}_2\mathrm{O}_3 : m\mathrm{AB} : x\mathrm{H}_2\mathrm{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\tfrac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; and at least one hydrogenating component selected from Group VIII metals and compounds thereof.

2. A catalyst as in claim 1, wherein said hydrogenating component is nickel or a compound thereof, and said catalyst further comprises tin or a compound thereof.

3. A catalyst as in claim 1, which further comprises a matrix comprising a siliceous gel, said layered aluminosilicate component being in particulate form and being dispersed in said matrix.

4. A catalyst as in claim 3, wherein said hydrogenating component is nickel or a compound thereof, and said catalyst further comprises tin or a compound thereof.

5. A catalyst as in claim 3, wherein said matrix comprises said siliceous gel and said hydrogenating component, and wherein said layered aluminosilicate component is substantially in the ammonia or hydrogen form and is substantially free of any catalytic loading metal or metals.

6. A catalyst as in claim 3, further comprising combined fluorine, in an amount of 0.1 to 10 weight percent, based on said catalyst.

7. A hydrocarbon conversion catalyst comprising:
(a) a gel matrix comprising a silica-alumina gel and at least one hydrogenating component selected from Group VIII metals and compounds thereof and
(b) a layered crystalline clay-type aluminosilicate in particulate form, said layered aluminosilicate having, prior to drying and calcining of said catalyst the empirical formula $$n\mathrm{SiO}_2 : \mathrm{Al}_2\mathrm{O}_3 : m\mathrm{AB} : x\mathrm{H}_2\mathrm{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\tfrac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; said layered aluminosilicate component being dispersed through said matrix.

8. A catalyst composite comprising:
(A) a gel matrix comprising:
(a) at least 15 weight percent silica,
(b) alumina, in an amount providing an alumina-to-silica weight ratio of 15/85 to 80/20, (c) a Group VIII component, in the form of metal, oxide, sulfide or any combination thereof, in an amount of 0.01 to 15 weight percent of said matrix, calculated as metal;

(B) a layered crystalline clay-type aluminosilicate in particulate form, dispersed through said matrix, said layered aluminosilicate having, prior to drying and calcining of said catalyst the empirical formula $$n\text{SiO}_2: \text{Al}_2\text{O}_3: m\text{AB}: x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\tfrac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations.

9. A catalyst composite as in claim 8, wherein said layered crystalline aluminosilicate is present in an amount of 1 to 50 weight percent, based on said composite.

10. A catalyst composite as in claim 8, wherein said layered crystalline aluminosilicate is substantially in the ammonia or hydrogen form, and is substantially free of any catalytic loading metal or metals.

11. A catalyst composite as in claim 8, further comprising combined fluorine, in an amount of 0.1 to 10 weight percent, based on said catalyst composite.

12. A catalyst composite as in claim 8, further comprising titanium, zirconium, thorium or hafnium or any combination thereof, in the form of the metals, oxides, sulfides or any combination thereof, in an amount of 1 to 10 weight percent of said matrix, calculated as metal.

13. A catalyst composite as in claim 12, comprising titanium in the form of titania.

14. A catalyst composite as in claim 8, characterized by an average pore diameter below 100 angstroms and a surface area above 200 square meters per gram.

15. A catalyst consisting essentially of:
(A) a porous xerogel comprising:
   (a) at least 15 weight percent silica,
   (b) alumina, in an amount providing an alumina-to-silica weight ratio of 15/85 to 80/20,
   (c) nickel, in the form of metal, oxide, sulfide, or any combination thereof, in an amount of 0.01 to 15 weight percent of said xerogel, calculated as metal,
   (d) titanium oxide, in an amount of 1 to 10 weight percent of said xerogel, calculated as metal;
(B) a layered crystalline clay-type aluminosilicate, in an amount of 1 to 50 weight percent of said catalyst, said layered aluminosilicate being in the form of particles, said particles being dispersed through said xerogel, said layered aluminosilicate having, prior to drying and calcining of said catalyst, the empirical formula $$n\text{SiO}_2: \text{Al}_2\text{O}_3: m\text{AB}: x\text{H}_2\text{O}$$

where the layer lattices comprise said silica, said alumina, and said B, and where $n$ is from 2.4 to 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\tfrac{1}{2}O^{--}$ and mixtures thereof, and is internal in the lattice, and $x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations; said catalyst having an average pore diameter below 100 angstroms and a surface area above 200 square meters per gram.

16. A hydrocracking process which comprises contacting a hydrocarbon feed containing substantial amounts of materials boiling above 200° F. and selected from the group consisting of petroleum distillates, solvent-deasphalted petroleum residua, shale oils and coal tar distillates, in a reaction zone with hydrogen and the catalyst of claim 1, at hydrocracking conditions including a temperature in the range 400° to 950° F., a pressure in the range 800 to 3500 p.s.i.g., a liquid hourly space velocity in the range 0.1 to 5.0, and a total hydrogen supply rate of 200 to 20,000 s.c.f. of hydrogen per barrel of feedstock, and recovering hydrocracked products from said reaction zone.

17. A process as in claim 16, wherein said hydrocarbon feed contains 0.5 to 1000 p.p.m. organic nitrogen.

18. A process as in claim 16, wherein said reaction zone contains, in addition to said catalyst, a separate second catalyst comprising a hydrogenating component selected from Group VI metals and compounds thereof, a hydrogenating component selected from Group VIII metals and compounds thereof, and a component selected from the group consisting of alumina and silica-alumina.

19. A process as in claim 18, wherein said separate second catalyst is located in said reaction zone in a bed disposed above said catalyst comprising a layered crystalline clay-type aluminosilicate component.

20. A hydrocracking process which comprises sequentially contacting a hydrocarbon feedstock and hydrogen with a first bed of catalyst and then with a second bed of catalyst, said catalyst beds both being located within a single elongated reactor pressure shell, said first bed of catalyst being located in an upper portion of said shell, the catalyst of said first bed comprising a hydrogenating component selected from the group consisting of Group VI metals and compounds thereof and Group VIII metals and compounds thereof and a component selected from the group consisting of alumina and silica-alumina, the catalyst of said second bed comprising the catalyst of claim 1, maintaining said first bed of catalyst and said second bed of catalyst at a temperature in the range 400° to 950° F., and a pressure in the range 800 to 3500 p.s.i.g. during said contacting, maintaining the total supply rate of said hydrogen into said reactor shell from 200 to 20,000 s.c.f. of hydrogen per barrel of said feedstock, and recovering a gasoline product from the effluent from said second bed of catalyst.

21. A process as in claim 20, wherein the effluent from said second bed of catalyst is separated into fractions, including a light gasoline fraction, a heavy gasoline fraction, and a fraction boiling generally higher than said heavy gasoline fraction.

22. A process as in claim 21, wherein said heavy gasoline fraction is catalytically reformed.

23. A process as in claim 21, wherein said fraction boiling generally higher than said heavy gasoline fraction is catalytically cracked.

References Cited

UNITED STATES PATENTS

| | | | |
|---|---|---|---|
| 3,132,087 | 5/1964 | Kelley et al. | 208—60 |
| 3,140,253 | 7/1964 | Plank et al. | 208—120 |
| 3,252,757 | 5/1966 | Granquist | 208—120 |

DELBERT E. GANTZ, Primary Examiner

A. RIMENS, Assistant Examiner

U.S. Cl. X.R.

208—60, 111; 252—455

PO-1050
(5/69)

UNITED STATES PATENT OFFICE
CERTIFICATE OF CORRECTION

Patent No. 3,535,228      Dated October 20, 1970

Inventor(s) SIGMUND M. CSICSERY ET AL.

It is certified that error appears in the above-identified patent and that said Letters Patent are hereby corrected as shown below:

Col. 2, lines 60-61, "embodiments is catalytically re-formed." should read --embodiments wherein a selected fraction from the hydrocracking zone is catalytically reformed.--.

Signed and sealed this 23rd day of November 1971.

(SEAL)
Attest:

EDWARD M. FLETCHER, JR.      ROBERT GOTTSCHALK
Attesting Officer            Acting Commissioner of Patents